(12) United States Patent
Mancl et al.

(10) Patent No.: US 6,952,062 B1
(45) Date of Patent: Oct. 4, 2005

(54) SEAL AND BEARING ASSEMBLY FOR A MOTOR

(76) Inventors: Dennis J. Mancl, 284 Essex Dr., Bluff City, TN (US) 37618; Leonard J. Lavasser, 387 Carlton Rd., Bristol, TN (US) 37620

( * ) Notice: Subject to any disclaimer, the term of this patent is extended or adjusted under 35 U.S.C. 154(b) by 0 days.

(21) Appl. No.: 10/884,747

(22) Filed: Jul. 2, 2004

(51) Int. Cl.$^7$ .............................. H02K 5/00; H02K 5/16

(52) U.S. Cl. .............................. 310/90; 310/85; 310/91

(58) Field of Search .............................. 310/85, 90, 91; 277/380, 381, 384, 394, 396, 397; 384/151, 384/152

(56) References Cited

U.S. PATENT DOCUMENTS

| | | | | |
|---|---|---|---|---|
| 3,087,078 A | * | 4/1963 | Brown | 310/83 |
| 5,726,511 A | * | 3/1998 | Kusase et al. | 310/90 |
| 6,316,856 B1 | * | 11/2001 | Kusaki et al. | 310/90 |
| 6,472,786 B1 | | 10/2002 | McCauley et al. | |

* cited by examiner

Primary Examiner—Tran Nguyen
(74) Attorney, Agent, or Firm—Robert J. Harter

(57) ABSTRACT

A motor, particularly suited for carpet cleaners and other wet vacuuming appliances, includes a motor housing with a stepped bore. The stepped bore is part of a bearing/seal assembly that simultaneously clamps a bearing and compresses a seal member. The assembly maintains the motor's commutator at a substantially fixed axial location relative to the commutator's brushes, regardless of the extent to which the seal is compressed and regardless of any subsequent creep of the seal.

15 Claims, 2 Drawing Sheets

SEAL AND BEARING ASSEMBLY FOR A MOTOR

BACKGROUND OF THE INVENTION

1. Field of the Invention

The subject invention generally pertains to electric motors for wet carpet cleaners and more specifically to a seal and bearing assembly for such a motor.

2. Description of Related Art

The motors of some vacuum cleaners, such as wet/dry shop vacs and wet carpet cleaners, are exposed to a significant amount of moisture-laden air. Some motors include one or more bearing seals to protect the bearings and other motor components from the moisture. The motors disclosed in U.S. Pat. No. 6,472,786, for example, include one seal that engages the motor shaft and a support cushion that sits between the bearing and the fan end bracket.

The method used for retaining seals and bearings can affect the axial position of the motor shaft relative to the motor's stator, which can thus affect the relative axial position of the motor's commutator and its brushes. In the '786 patent, for instance, the bearing protection system permits some change in the shaft's axial position due to the compressibility of the support cushion and the way the inboard bearing is mounted.

Even a slight shift in the axial position of the shaft can greatly diminish the life and performance of the motor. A motor's brushes normally wear a track in the commutator, as the shaft rotates at about 20,000 to 30,000 rpm. An axial shift in the position of the shaft could force the brushes slightly out from within their tracks. As a result, portions of the brushes may lift slightly away from the surface of the commutator, which can cause electrical arching between the brushes and the commutator.

Since flexible or compressible seal materials typically creep under load, it can be difficult to provide a motor with a bearing seal whose compressibility does not at least partially determine the axial position of the motor shaft. Thus, a need exists for an improved seal and bearing assembly that ensures that a motor shaft is maintained at a substantially fixed axial position regardless of the seal's compression.

SUMMARY OF THE INVENTION

One object of some embodiments of the invention is to provide a bearing retainer that simultaneously clamps a bearing and a separate seal in place.

Another object of some embodiments is to establish a substantially fixed axial position for a motor shaft regardless of the extent to which the seal is compressed.

Another object of some embodiments is to provide a seal assembly that sets the motor shaft at a predetermined axial location regardless of whether a seal is included or omitted from the assembly, whereby the motor can be readily produced with or without a seal.

Another object of some embodiments is to provide a motor shaft whose axial position is independent of any creep in the motor's seal.

Another object of some embodiments is to provide a motor whose bearings and seal are independent parts so that the seal can be selectively included or omitted from the motor.

Another object of some embodiments is to provide a motor housing with a seal-biting lip that helps grip the seal.

Another object of some embodiments is to provide a motor with a seal made of a creep susceptible material, such as polytetrafluoroethylene, but have the seal inserted in a seal retaining structure that ensures that the seal's creep does not affect the axial position of the motor shaft.

Another object of some embodiments is to coat the seal with a lubricant to reduce wear and enhance its ability to repel moisture.

Another object of some embodiments is to provide a motor shaft (or sleeve thereon) with an outside diameter that is greater than the seal's inside diameter to create a radial interference fit that ensures sealing between the two.

Another object of some embodiments is to provide a sealed motor with a weather resistant plastic housing and to further provide the motor with a ground strap, as the plastic housing is generally electrically nonconductive.

Another object of some embodiments is to install the subject motor in a wet carpet cleaner, as the motor is particularly suited for that purpose.

One or more of these and/or other objects of the invention are provided by a motor that comprises a motor housing, a stator, a rotor shaft, a seal, a bearing, and a bearing retainer. To shield the bearing from moisture while, at the same time, fixing the axial position of the rotor shaft, the bearing retainer clamps the bearing and seal within a stepped bore such that the axial position of the shaft is independent of the seal's compression or subsequent creep.

DESCRIPTION OF THE PREFERRED EMBODIMENT

Figure 1:
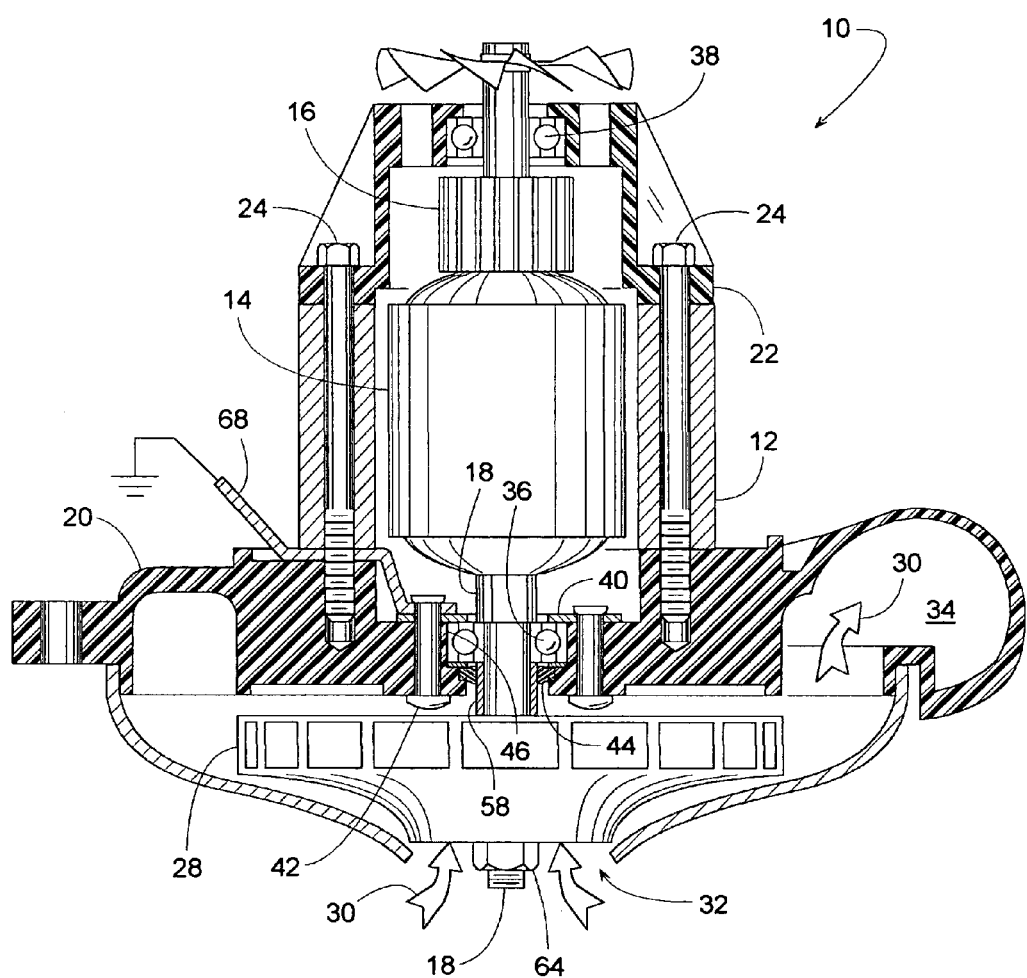
FIG. 1 is a cross-sectional view of a motor that includes a seal and bearing retainer for a motor according to one embodiment of the invention.
Figure 2:
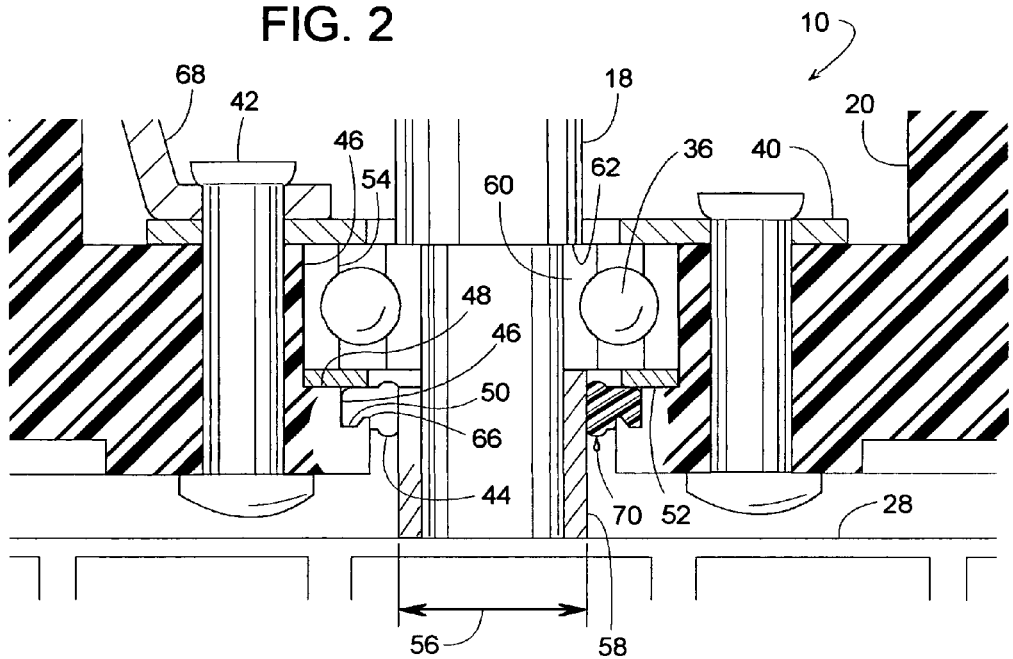
FIG. 2 is an enlarged sectional view of the seal and bearing retainer of FIG. 1.
Figure 3:
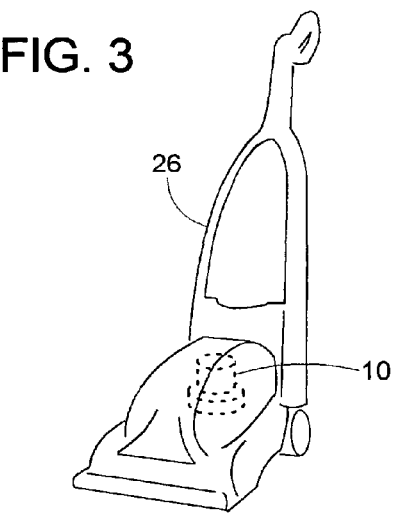
FIG. 3 is a perspective view of a wet carpet cleaner that includes the sealed motor of FIG. 1.

A motor 10, shown in FIGS. 1 and 2, comprises a stator 12, a rotor 14 that includes a commutator 16 and a rotor shaft 18, a motor housing 20 made of plastic or some other material, and a commutator bracket 22 also made of plastic or some other material. Two tie rods 24 are each threaded at one end so that they can screw into housing 20 for clamping stator 12 between housing 20 and bracket 22. Commutator 16 on rotor 14 is engaged by a pair of commutator brushes (not shown) to deliver electrical current to the rotor. The commutator brushes can be of any type including, but not limited to, those that are well known to those of ordinary skill in the art. The brushes, for example, can be carbon bars that are spring biased radially against commutator 16. In a currently preferred embodiment, motor 10 can be for a wet carpet cleaner 26 (FIG. 3), wet/dry shop vac, or similar vacuum cleaning appliance where rotor 14 drives an impeller 28 that forces a fluid 30 from a fan inlet 32 to a discharge outlet 34 of housing 20. Fluid 30 may be dry air, moisture-laden air, and/or water.

An inboard bearing 36 in housing 20 and an outboard bearing 38 in bracket 22 support rotor 14 within stator 12. An annular bearing retainer 40 made of sheet metal is attached to housing 20 by way of a bearing retainer fastener 42. Bearing retainer fastener 42 represents any fastener for holding bearing retainer 40 to housing 20. Examples fastener 42 include, but are not limited to, a rivet, a screw and nut assembly, a self-tapping screw, etc.

To provide an assembly that simultaneously clamps inboard bearing 36 and a separate bearing seal 44 in place, and to establish a substantially fixed axial position for rotor 14 regardless of the extent to which seal 44 is compressed, housing 20 includes a stepped bore 46 that provides a first step 48 and a second step 50. A washer 52 rests on step 48, and seal 44 rests on step 50 such that seal 44 is sandwiched between washer 52 and step 50. When tightened, fastener 42 clamps an outer race 54 of bearing 36 between bearing retainer 40 and washer 52, and also clamps seal 44 between washer 52 and step 50.

Seal 44 is an annular piece that can be made of a low friction, compressible material such as polytetrafluoroethylene (e.g., GORE-TEX, TEFLON, etc.). In its relaxed state prior to assembly, an inside diameter of seal 44 is slightly smaller than an outside diameter 56 of shaft 18 so that a sealingly tight radial interference fit is created between seal 44 and shaft 18. In some cases, shaft 18 includes a sleeve 58 adjacent to seal 44, whereby the radial interference fit is between seal 44 and sleeve 58.

Although sleeve 58 may provide shaft 18 with a smooth wear resistant surface for seal 44, its primary purpose is to help lock the axial position of bearing 36 to shaft 18. An inner race 60 of bearing 36 is situated between sleeve 58 and a shoulder 62 of shaft 18. A nut 64 threads onto the inboard end of shaft 18 to axially clamp inner race 60, sleeve 58, and impeller 28 between shoulder 62 and nut 64. Clamping inner race 60 to shaft 18 and clamping outer race 54 to housing 20, establishes a substantially fixed axial relationship between rotor 14 and housing 20, which helps maintain a substantially constant axial relationship between commutator 16 and its associated brushes, regardless of the extent to which seal 44 is compressed.

Providing housing 20 with stepped bore 54 not only makes the relative axial position of shaft 18 and housing 20 independent of the seal's compressed thickness, but seal 44 can be omitted from motor 10 altogether. Thus, a motor can be selectively assembled as a sealed or unsealed motor by simply installing or omitting seal 44.

To limit seal 44 from progressively creeping out from within the confines of step 50 and washer 52, step 50 may be provided with a seal-biting lip 66 that extends axially into seal 44, whereby lip 66 helps inhibit inward radial creep of seal 44.

If housing 20 is made of an electrically nonconductive plastic, a ground strap 68 can be made to extend from bearing retainer 40. Fastener 42 can connect ground strap 68 to retainer 40, or strap 68 can be an integral extension thereof.

In some cases, seal 44 is coated with a lubricant 70 to reduce wear and enhance the seal's ability to repel water.

Although the invention is described with reference to a preferred embodiment, it should be appreciated by those of ordinary skill in the art that various modifications are well within the scope of the invention. Therefore, the scope of the invention is to be determined by reference to the following claims.

What is claimed is:

1. A motor, comprising:
   a housing defining a stepped bore that provides a first step and a second step;
   a bracket;
   an outboard bearing supported by the bracket;
   a stator interposed between the housing and the bracket;
   a seal engaging the second step;
   a washer engaging the first step;
   an inboard bearing having an outer race and an inner race and being disposed within the stepped bore such that the outer race engages the washer;
   a bearing retainer engaging the outer race of the inboard bearing;
   a fastener attaching the bearing retainer to the housing such that the outer race is clamped between the bearing retainer and the washer, the washer is clamped between the outer race and the first step, and the seal is compressed between the washer and the second step;
   a rotor shaft having an outboard end and an inboard end, wherein the outboard end is supported by the outboard bearing and the inboard end has a shoulder that engages the inner race of the inboard bearing;
   a sleeve disposed around the inboard end of the rotor shaft, wherein the sleeve engages the inner race of the inboard bearing and engages an inner diameter of the seal;
   an impeller attached to the inboard end of the rotor shaft and engaging the sleeve; and
   a nut screwed onto the inboard end of the rotor shaft such that the impeller, the sleeve, and the inner race of the inboard bearing are held in compression between the nut and the shoulder of the rotor shaft, thereby an axial position of the rotor shaft relative to the stator is substantially independent of axial creep of the seal if such axial creep were to occur.

2. The motor of claim 1, further comprising a seal-biting lip disposed on the second step and protruding toward the inboard bearing such that the seal-biting lip extends axially into the seal which is compressed between the washer and the second step, thereby the seal-biting lip helps inhibit inward radial creep of the seal.

3. The motor of claim 1, wherein the seal is comprised of polytetrafluoroethylene.

4. The motor of claim 1, wherein the seal is coated with a lubricant.

5. The motor of claim 1, wherein the seal has a relaxed inside diameter that prior to assembly is smaller than an outside diameter of the sleeve, thereby creating a radial compressive fit therebetween which stretches the inside diameter of the seal when the sleeve is inserted through the inside diameter of the seal.

6. The motor of claim 1, wherein the housing is comprised of a plastic material.

7. The motor of claim 6, further comprising a ground strap extending from the bearing retainer.

8. The motor of claim 1, wherein the impeller is adapted to force moisture-laden air through the housing, whereby the motor is adapted for use in a wet carpet cleaner.

9. A motor, comprising:
   a housing defining a stepped bore that provides a first step and a second step;
   a bracket;
   an outboard bearing supported by the bracket;
   a stator interposed between the housing and the bracket;
   a seal engaging the second step;
   a washer engaging the first step;
   an inboard bearing having an outer race and an inner race and being disposed within the stepped bore such that the outer race engages the washer;
   a bearing retainer engaging the outer race of the inboard bearing;
   a fastener attaching the bearing retainer to the housing such that the outer race is clamped between the bearing retainer and the washer, the washer is clamped between the outer race and the first step, and the seal is compressed between the washer and the second step;

a seal-biting lip disposed on the second step and protruding toward the inboard bearing such that the seal-biting lip extends axially into the seal which is compressed between the washer and the second step, thereby the seal-biting lip helps inhibit inward radial creep of the seal;

a rotor shaft having an outboard end and an inboard end, wherein the outboard end is supported by the outboard bearing and the inboard end has a shoulder that engages the inner race of the inboard bearing;

a sleeve disposed around the inboard end of the rotor shaft such that the sleeve engages the inner race of the inboard bearing and engages an inner diameter of the seal, wherein the seal has a relaxed inside diameter that prior to assembly is smaller than an outside diameter of the sleeve, thereby creating a radial compressive fit therebetween which stretches the inside diameter of the seal when the sleeve is inserted through the inside diameter of the seal;

an impeller attached to the inboard end of the rotor shaft and engaging the sleeve; and a nut screwed onto the inboard end of the rotor shaft such that the impeller, the sleeve, and the inner race of the inboard bearing are held in compression between the nut and the shoulder of the rotor shaft, thereby an axial position of the rotor shaft relative to the stator is substantially independent of axial creep of the seal if such axial creep were to occur.

10. The motor of claim 9, wherein the seal is comprised of polytetrafluoroethylene.

11. The motor of claim 9, wherein the seal is coated with a lubricant.

12. The motor of claim 9, wherein the housing is comprised of a plastic material.

13. The motor of claim 12, further comprising a ground strap extending from the bearing retainer.

14. The motor of claim 9, wherein the impeller is adapted to force moisture-laden air through the housing, thereby the motor is adapted for use in a wet carpet cleaner.

15. A motor, comprising:
a housing made of plastic and defining a stepped bore that provides a first step and a second step;
a bracket;
an outboard bearing supported by the bracket;
a stator interposed between the housing and the bracket;
a seal comprising polytetrafluoroethylene and engaging the second step;
a lubricant coating the seal;
a washer engaging the first step;
an inboard bearing having an outer race and an inner race and being disposed within the stepped bore such that the outer race engages the washer;
a bearing retainer engaging the outer race of the inboard bearing;
a ground strap extending from the bearing retainer;
a fastener attaching the bearing retainer to the housing such that the outer race is clamped between the bearing retainer and the washer, the washer is clamped between the outer race and the first step, and the seal is compressed between the washer and the second step;
a seal-biting lip disposed on the second step and protruding toward the inboard bearing such that the seal-biting lip extends axially into the seal which is compressed between the washer and the second step, thereby the seal-biting lip helps inhibit inward radial creep of the seal;
a rotor shaft having an outboard end and an inboard end, wherein the outboard end is supported by the outboard bearing and the inboard end has a shoulder that engages the inner race of the inboard bearing;
a sleeve disposed around the inboard end of the rotor shaft such that the sleeve engages the inner race of the inboard bearing and engages an inner diameter of the seal, wherein the seal has a relaxed inside diameter that prior to assembly is smaller than an outside diameter of the sleeve, thereby creating a radial compressive fit therebetween which stretches the inside diameter of the seal when the sleeve is inserted through the inside diameter of the seal;
an impeller attached to the inboard end of the rotor shaft and engaging the sleeve; and
a nut screwed onto the inboard end of the rotor shaft such that the impeller, the sleeve, and the inner race of the inboard bearing are held in compression between the nut and the shoulder of the rotor shaft, thereby an axial position of the rotor shaft relative to the stator is substantially independent of axial creep of the seal if such axial creep were to occur.

* * * * *